Figure 1:
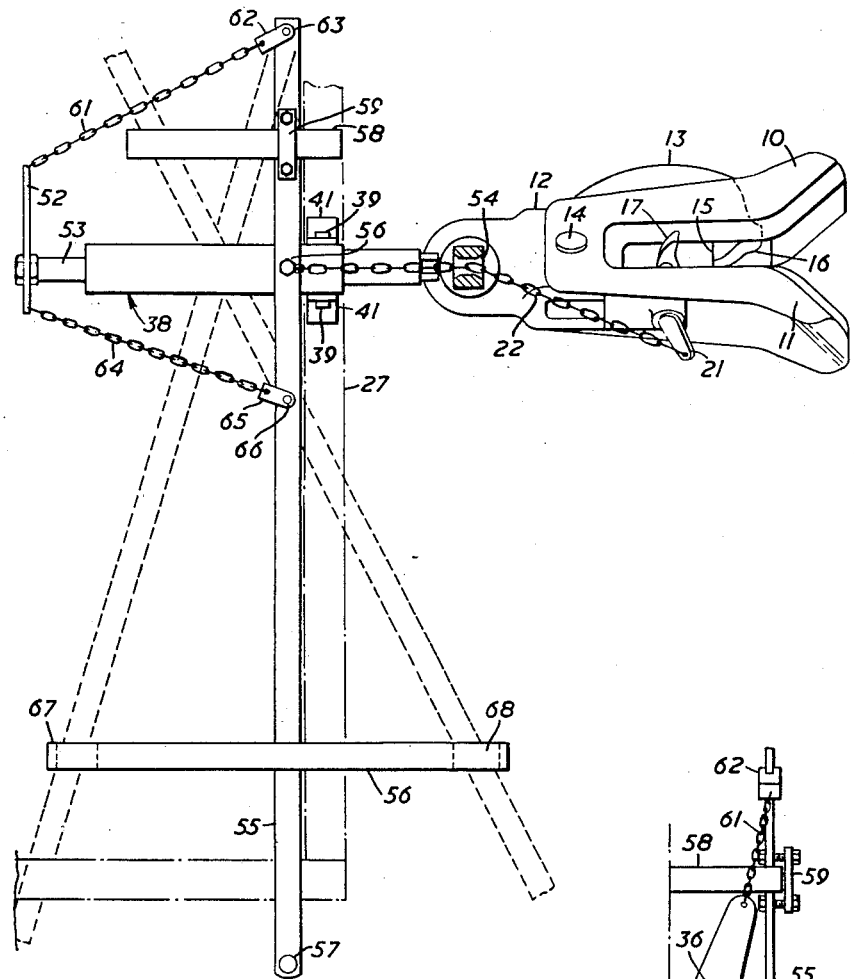

May 8, 1962   P. E. CHECKLEY ETAL   3,033,386
RELEASE MECHANISM FOR AUTOMATIC VEHICLE COUPLERS
Filed Sept. 19, 1960   2 Sheets-Sheet 1

INVENTORS
PETER EDWARD CHECKLEY
RICHARD JOHN HOLLIS
BY Reynolds & Christensen
ATTORNEYS

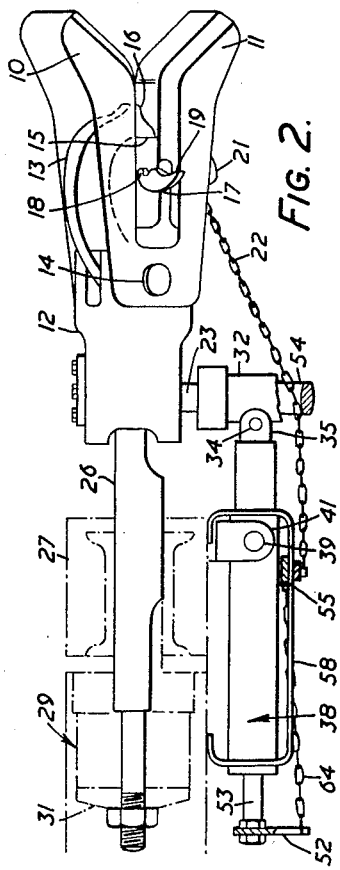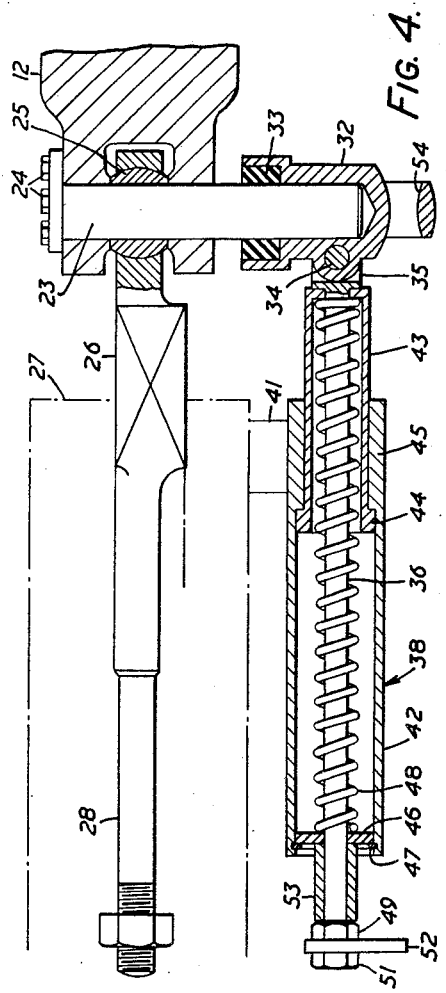

United States Patent Office 3,033,386
Patented May 8, 1962

3,033,386
RELEASE MECHANISM FOR AUTOMATIC
VEHICLE COUPLERS
Peter E. Checkley, Cheltenham, and Richard J. Hollis, Tewkesbury, England, assignors to Dowty Hydraulic Units Limited, Ashchurch, England, a British company
Filed Sept. 19, 1960, Ser. No. 56,785
Claims priority, application Great Britain Sept. 25, 1959
7 Claims. (Cl. 213—217)

This invention relates to release mechanism for effecting disengagement of automatic vehicle couplers in which disengagement of a latch or other coupling element is effected through a connecting element by a release lever mounted on the vehicle. The invention is concerned with an automatic coupler which is slidably mounted with respect to the vehicle and in particular with one which is also pivotally mounted to enable mutual alignment with a counter coupler on an adjacent vehicle to be effected.

The connecting element is joined to a release operating member, which may be a lever or plunger, mounted on the coupler. The distance between the release lever, which is normally mounted on a pivot fixed to the wagon, and the release operating member will vary with longitudinal sliding movement of the coupler and it is possible for inadvertent release of the couplers to occur as the result of excessive tension load pulling the coupler outwardly beyond its normal positions and lengthening the distance between the release lever and the release operating member. Furthermore, since the point of connection between the connecting element and the release operating member is to some extent offset from the pivotal centre of the coupler, it follows that the distance between this point of connection and a fixed location on the vehicle provided by the release lever will vary with movement of the coupler about its pivotal axes.

The release lever will generally have two fixed locations, one for "engagement" and the other for "disengagement" of the coupler. If the coupler is turned one way or another about its pivotal centre when the release lever is in its first-mentioned location, in the one case it will not be possible to effect full disengagement by the release lever, and in the other case the release lever cannot be fully displaced to secure it in its second fixed location.

According to one aspect of the invention, release mechanism for an automatic coupler which is mounted for backward and forward sliding movement with respect to a railway vehicle comprises, a release lever mounted on the vehicle, a connecting element extending backwardly from a release operating member on the coupler to a connecting point on the release lever, and a lever fulcrum having mechanical connection with the coupler for backward and forward movement therewith.

According to a more detailed view of the invention, release mechanism for an automatic coupler which is mounted for backward and forward longitudinal sliding movement with respect to a railway vehicle and which is also mounted for pivotal movement about vertical and horizontal transverse axes comprises a release lever mounted on the vehicle, a connecting element extending backwardly from a release operating member on the coupler to a connecting point on the release lever, a guide for the connecting element disposed below the pivotal mounting of the coupler, a longitudinally extending rod connected at its forward end to the coupler at or adjacent to said guide so as to partake of longitudinal sliding movement of the coupler and to undergo longitudinal sliding movement upon pivotal movement of the coupler about the horizontal transverse axis of its mounting, and a lever fulcrum mechanically connected with the back end of the rod so as to partake of longitudinal movement therewith.

Figure 3:
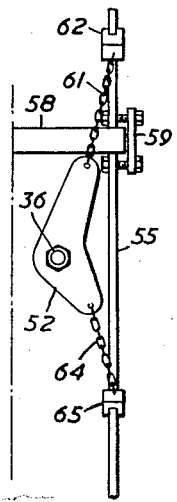

The invention is illustrated in the accompanying drawings of which:
FIGURE 1 is a plan view from below of an automatic coupler and associated release mechanism;
FIGURE 2 is a side elevation of the coupler and release mechanism;
FIGURE 3 is an end elevation from the left hand side of FIGURE 1 of part of the mechanism; and
FIGURE 4 is a side elevation partly in section showing the mounting of the automatic coupler on an enlarged scale.

The invention is shown applied to an automatic coupler of the kind having a pair of gathering horns 10 and 11 spaced apart with a gap between them and mounted on a base 12 so as to lie in a plane, which extends longitudinally and is inclined at 45° to be vertical. A latch 13 carried at its rear end by a pin 14 in the base 12 pivots in the plane of the horns 10 and 11 and is spring loaded by means, not shown so that the tip 15 enters the gap between the horns 10 and 11. The outer end of the latch 13 has a projection 16 for locking purposes. A claw 17 interposed in the gap between the horns 10 and 11 is mounted to pivot in a plane perpendicular to that of the latch 13 and it is spring loaded by means not shown, in the clockwise sense of FIGURE 2 so that a catch portion 18 at one end of the claw is capable of locking on to the projection 16 of the latch 13 of a counter coupler. The projection 16 of the latch 13 shown in FIGURE 1 is likewise engageable by the claw 17 pivotally mounted on the counter-coupler. The claw 17 also has a tail 19 which, when the claw 17 is turned in an anticlockwise direction, engages the tip of the latch 13 on the counter-coupler to displace it out of engagement with the latch 15 on the coupler shown in the drawing.

The claw 17 can be turned by a lever 21 to which a chain 22 or other suitable tension element is attached for operating the lever 21 from a position remote from the automatic coupler. The horn type of coupler is one of many kinds of automatic coupler to which the invention can be applied, having in common the provision of a release operating member such as the lever 21 which is operable by the connecting element 22.

Referring to FIGURE 4, the base 12 of the coupler is seen to carry a pin 23 which extends along a substantially vertical axis and is secured to the base 12 by screws 24. The pin 23 carries a portion of a sphere 25 which is received in a spherical socket in the front end of a drawbar 26 whereby the coupler is capable of turning about both horizontal transverse and vertical axes which intersect at the centre of the ball 25. The drawbar 26 is mounted slidably in the underframe 27 of a railway vehicle and the rear end 28 of the drawbar 26 passes in known manner through a snatch spring 29 which is interposed between the underframe 27 and a retaining plate 31 secured on the rear end 28 of the drawbar 26. When the drawbar 26 slides inwardly, the snatch spring 29 separates from the cooperating abutment surface of the underframe 27, but when the drawbar 26 is pulled outwardly under tension, the snatch spring 29 is compressed.

The pin 23 extends downwardly into a cup 32 in the upper portion of which is received a rubber torsion spring 33 whose outer and inner surface respectively are fixed in non-slipping engagement with the cup 32 and the pin 23. The cup is connected by a pivot pin 34 to the head 35 of a stop rod 36 which extends longitudinally through a spring device 38 carried by trunnion bearings 39 in a bracket 41 attached to the underframe 27. The spring device comprises an outer cylinder 42 and a telescopically mounted inner cylinder 43 having a flange 44 at its inner end which is engageable with an inturned flange 45 of the outer cylinder 42 to provide an out-stop. A disc 46 fitting the other end of the outer cylinder 42 is retained therein by a circlip 47 and a coil spring 48 is interposed between the end of the inner cylinder 43 and the disc 46. The stop rod 36 extends through the spring 48 and its emergent end carries nuts 49 and 51 between which a plate 52 is secured, while a spacer 53 in the form of a tube is interposed between the nut 49 and the disc 46.

In the condition shown in FIGURE 4, the spring 48 is fully extended and maintains the pin 23 substantially vertical with the coupler 12 in the horizontal position. The coupler and counter-coupler are designed to engage in mutual alignment and if one wagon is higher than the other due to different loading, the coupler may be displaced from its horizontal position. If the coupler is displaced downwardly, the head 35 of the stop rod 36 presses the inner cylinder 43 inwardly against the compressive load of the spring 48. If the coupler rises above the horizontal, the stop rod 36 acting through the nut 49 and the spacer 53, pulls on the disc 46 and compresses the spring 48. If the coupler is turned to the right or left about the vertical axis of the pin 23, the torsion spring 33 exerts a restoring force since the cup 32 is held from rotation about the vertical axis by the horizontal pivot 34, and by the restraint of the trunnion bearings 39.

The release chain 22 passes through a guide formed as a doubly flared opening 54 in the lower end of the cup 32 and its rearward end is attached to a release lever 55 vertically below the spring device 38. The release lever extends horizontally in a generally transverse direction towards the side of the wagon where it is supported by a longitudinally extending guide strip 56. The lever 55 extends beyond the guide strip and has a handle 57 fixed to its outer end. The other end portion of the lever 55 is supported by a guide strip 58 which as shown in side view on FIGURE 3 comprises a middle portion parallel to the guide strip 56, see FIGURE 1, and end portions which are bent through a right angle upwardly and again inwardly to enable attachment to be made to the underframe by suitable means. The lever 55 is loosely located on the middle portion of the guide strip 58 by a strap 59 and fastening bolts, see FIGURE 3 which permit the lever 55 to slide along the middle portion of the strip 58, but not transversely thereto. The plate 52 secured to the rear end of the stop rod 36 carried a chain 61 which is connected by a shackle 62 to a pivot pin 63 at the inner end of the lever 55. A chain 64 attached to the other end of the plate 52 is connected by a shackle 65 to a pivot pin 66 at an intermediate point on the lever 55. The outer end of the lever 55 is displaceable horizontally in the guide strip 56 through equal distances to end positions at which the lever 55 may be retained by gates 67 and 68.

The claw 17 is pring loaded towards the locking position so that the end of the release operating lever 21 to which the chain 22 is attached is likewise urged towards the outer end of the coupler whereby tension is maintained in the chain 22 and in at least one of the chains 61 and 64.

The manner in which the release mechanism operates independently of the sliding movement of the drawbar and pivotal movement of the coupler about its horizontal transverse and vertical pivotal axes, will now be described.

If the coupler moves inwardly while maintaining its horizontal and longitudinal attitude, the stop rod 36 by virtue of its connection to the pin 23 will move inwardly to a corresponding extent so that the plate 52 to which the chains 61 and 64 are fixed will now move the inner portion of the lever 55 inwardly. Thus the point of attachment 56 of the chain 22 to the lever 55 will move correspondingly whereby the effective distance from this point 56 through the opening 54 to the operating lever 21 will remain substantially unaltered. This rearward movement is small compared with the length of the lever 55 and the displacement necessary to put the lever in either of the gates 67 or 68. If the handle 57 is displaced to the right to bring the lever 55 into the gate 68, the chain 64 remains in tension and the shackle pivot 66 acts as a fulcrum for the lever 55 whereby the chain 22 is pulled rearwardly, causing the claw 17 to release the lock on the latch of the counter-coupler and then to displace the latch out of engagement as previously described. If on the other hand the lever 55 is displaced from its rest position to the left in FIGURE 1, the chain 61 remains in tension and the shackle pivot 63 forms the fulcrum about which the lever 55 turns. The distances of the shackle pivots 63 and 66 from the chain connecting point 56 are chosen so that when either pivot is acting as fulcrum, the rearward displacement of the point 56 will be the same for equal movements of the lever 55 on opposite sides of the rest position.

The double action of the lever 55 facilitates release of the coupler when the wagon is moving in a marshalling yard or siding. The operator merely has to grasp the handle 57 and hold on to it until the wagon has moved sufficiently to bring the lever 55 into register with one of the gates 67 and 68 according to the direction of wagon movement.

If the coupler is displaced in one direction or the other about the vertical axis of the pin 23 it will be seen that the distance between the point of attachment 56 and the opening 54 in the lower end of the pin 23 remains the same and also the distance between the opening 54 and the operating lever 21 remains substantially the same. The angle between the two reaches of the chain on opposite sides of the opening 54 will vary upon such turning movement of the coupler so that the direct distance between the lever 21 and the point of attachment 56 will correspondingly vary, but the effective distance from one to the other through the opening 54 remains substantially unaltered. The release mechanism will, therefore, operate normally regardless of such angular displacement of the coupler about the vertical axis as may occur in normal use with coupled wagons.

Considering now the case of pivotal movement of the coupler about the horizontal transverse axis through the spherical portion 25, it is seen that the pin 23 will impart longitudinal movement to the stop rod 36 carrying the plate 52 to which the chains 61 and 64 are attached. The pivot pin 34 between the cup 32 and the stop rod 36 is nevertheless close to the opening 54 so that the distance between the opening and the plate 52 will remain substantially constant. Moreover, the distance between the opening 54 and the lever 21 remains the same. Thus, the effective distance from the point of attachment 56 to the lever 21 through the opening 54 is substantially unaffected by the linear motion and two modes of angular motion of the coupler considered separately it follows that this condition will hold if more than one of the modes of motion are combined.

We claim as our invention:

1. Release mechanism for an automatic coupler which is mounted for backward and forward sliding movement on a railway vehicle, said mechanism comprising a release lever mounted on the vehicle, a connecting point on the release lever, a connecting element joined at one end to the connecting point and adapted at its other end for connection to a release operating member on the automatic coupler, a fulcrum point on the release lever spaced from said connecting point, and connecting means interposed between the fulcrum point and the coupler with effect to control backward and forward movement of the fulcrum point in accordance with backward and forward movement of the coupler.

2. Release mechanism according to claim 1, including a handle disposed at one side of the vehicle and guide means constraining said handle for movement backwards and forwards in the longitudinal direction of the vehicle, said handle being operatively connected to the release lever for turning the latter about its fulcrum point upon movement of the handle.

3. Release mechanism for an automatic coupler which is mounted for backward and forward sliding movement on a railway vehicle, said mechanism comprising a release lever mounted on the vehicle, a connecting point on the release lever, a connecting element joined at one end to the connecting point and adapted at its other end for connection to a release operating member on the automatic coupler, two fulcrum points on the release lever spaced on opposite sides of the connecting point, connecting means interposed between each fulcrum point and the coupler with effect to control backward and forward movement of the fulcrum points in accordance with backward and forward movement of the coupler, each of said connecting means being inextensible but contractable, a handle disposed at one side of the wagon, and guide means constraining said handle for movement to each side of a neutral position in the longitudinal direction of the vehicle, said handle being operatively connected to the release lever to turn the latter about one fulcrum point when the handle is moved on one side of the neutral position, and to turn the release lever about the other fulcrum point when the handle is moved on the other side of the neutral position.

4. Release mechanism according to claim 3, wherein the two fulcrum points are spaced at such distances from the connecting point that equal movements of the handle on opposite sides of the neutral position act on the release lever to produce equal movements of the connecting point to which the release operating member is connected.

5. Release mechanism for an automatic coupler which is connected to a drawbar slidable longitudinally in a railway vehicle, the connection of the coupler to the drawbar being provided by a pivotal joint which enables the coupler to pivot about vertical and horizontal transverse axes, said mechanism comprising a release lever mounted on the vehicle, a connecting point on the release lever, a connecting element joined at one end to the connecting point and adapted at its other end for connection to a release operating member on the automatic coupler, a guide for the connecting element disposed below the pivotal joint, a rod mounted on the vehicle longitudinally and below the drawbar for endwise movement, the forward end of the rod being connected to the coupler adjacent said guide so as to partake of longitudinal sliding movement of the coupler and to undergo longitudinal movement upon pivotal movement of the coupler about the horizontal transverse axis of said pivotal joint, a fulcrum point on the release lever and connecting means interposed between the fulcrum point and the back end of the rod whereby the fulcrum point will partake of longitudinal movement with the rod.

6. Release mechanism according to claim 5, wherein the guide comprises a locating aperture in fixed association with the coupler, and the connecting element is a flexible tension element passing through said aperture.

7. Release mechanism for an automatic coupler which is mounted on a railway vehicle, said mechanism comprising a release lever mounted on the wagon, a connecting point on the release lever, a connecting element joined at one end to the connecting point and adapted at its other end for connection to a release operating member on the automatic coupler, a fulcrum point on the lever spaced from said connecting point, a handle disposed at one side of the vehicle and guide means constraining said handle for movement backwards and forwards in the longitudinal direction of the vehicle, said handle being operatively connected to the lever for turning the latter about its fulcrum point upon movement of the handle.

No references cited.